(12) United States Patent
Cho et al.

(10) Patent No.: US 8,786,607 B2
(45) Date of Patent: Jul. 22, 2014

(54) APPARATUS AND METHOD OF GENERATING PERSONAL FONTS

(75) Inventors: Sung-Jung Cho, Seoul (KR); Jin-Hyung Kim, Daejeon (KR); Dae-Hwan Kim, Daejeon (KR)

(73) Assignees: Samsung Electronics Co., Ltd., Suwon-Si (KR); Korea Advanced Institute of Science, Daejeon (KR)

( * ) Notice: Subject to any disclaimer, the term of this patent is extended or adjusted under 35 U.S.C. 154(b) by 386 days.

(21) Appl. No.: 12/320,360

(22) Filed: Jan. 23, 2009

(65) Prior Publication Data

US 2009/0189905 A1    Jul. 30, 2009

(30) Foreign Application Priority Data

Jan. 28, 2008 (KR) .................. 10-2008-0008630

(51) Int. Cl.
*G06T 11/00* (2006.01)
(52) U.S. Cl.
USPC .......................................... 345/467; 382/187
(58) Field of Classification Search
CPC ... G06F 17/214; G06K 9/6255; G06T 11/203
USPC .......................................................... 345/467
See application file for complete search history.

(56) References Cited

U.S. PATENT DOCUMENTS

| | | | |
|---|---|---|---|
| 6,958,755 B1 * | 10/2005 | Dickens | 345/467 |
| 7,200,267 B1 * | 4/2007 | Bennett et al. | 382/187 |
| 7,228,295 B2 * | 6/2007 | Lapointe et al. | 706/21 |
| 7,469,062 B2 | 12/2008 | Napper | |

FOREIGN PATENT DOCUMENTS

| | | |
|---|---|---|
| JP | 7-271897 | 10/1995 |
| JP | 09198466 A * | 7/1997 |
| JP | 2002-15281 | 1/2002 |
| KR | 10-2004-0082558 | 9/2004 |
| KR | 10-2005-0036862 | 4/2005 |
| KR | 10-2006-0084945 | 7/2006 |

OTHER PUBLICATIONS

Verified English Translation (including Declaration executed by Translator) of Korean Application No. 10-2004-7005554 filed Apr. 14, 2004 (published as KR 10-2005-0036862 on Apr. 20, 2005).

(Continued)

*Primary Examiner* — Kee M Tung
*Assistant Examiner* — Peter Hoang
(74) *Attorney, Agent, or Firm* — Staas & Halsey LLP

(57) ABSTRACT

An apparatus and method of generating personal fonts is provided, which can modify a trace of handwriting inputted by a user into an elegant one and generate diverse personal fonts in accordance with user's style of handwriting. The apparatus for generating personal fonts includes a character input unit to receive an input of a character trace from a user, a character recognition unit to recognize a representative character corresponding to an input character from the input character trace, a representative trace generation unit to generate a representative trace expressing a trace of the representative character, and a trace modification unit to modify the trace of the input character by combining a weight value of the generated representative trace with the trace of the input character.

16 Claims, 8 Drawing Sheets

INPUT TRACE
(10)

REPRESENTATIVE TRACE
(20)

(56) References Cited

OTHER PUBLICATIONS

H. Choi et al., "Writer Dependent Online Handwriting Generation with Bayesian Network", Proceedings of 9$^{th}$ Int'l Workshop on Frontiers in Handwriting Recognition, IEEE, 2004, 6 pages.

Gyeonghwan Kim, "An Approach for Efficient Handwritten Word Recognition Using Dynamic Programming Matching", Dept. of Electronic engineering, Sogang University, Apr. 1999, pp. 54-64.
Korean Office Action dated Jan. 24, 2014 from Korean Patent Application No. 10-2008-0008630, 5 pages.

* cited by examiner

INPUT TRACE (10)

REPRESENTATIVE TRACE (20)

INPUT TRACE
(10)

MODIFIED TRACE
(30)

REPRESENTATIVE TRACE
(20)

APPARATUS AND METHOD OF GENERATING PERSONAL FONTS

CROSS-REFERENCE TO RELATED APPLICATIONS

This application is based on and claims priority from Korean Patent Application No. 10-2008-0008630, filed on Jan. 28, 2008, in the Korean Intellectual Property Office, the disclosure of which is incorporated herein in its entirety by reference.

BACKGROUND

1. Field

Embodiments relate to an apparatus and method of generating personal fonts, and more particularly to an apparatus and method of generating personal fonts, which may modify a trace of handwriting into an elegant one and generate personal fonts in accordance with a user's style of handwriting.

2. Description of the Related Art

Generally, an electronic device such as a personal computer (PC), a television (TV), or the like, is provided with an input device for receiving information from a user. A pen input method using a pen, a digitizer, or like, which is one of various methods for user input of information through an input device, is similar to an information transfer method using a pen and paper, which is the most classic and universal character expression tool of a human being, and thus it has been widely used as an input method that is familiar with a user.

Such a pen input method may be briefly classified into two methods. One is a method in which a virtual keyboard (called a soft keyboard) is displayed by software on a screen, and a user inputs character information by pointing keys on the keyboard using a pen, and the other is a method in which a user takes notes on a specified device, such as a digitizer using a pointing device, such as a pen, and the device recognizes this to input corresponding character information.

However, a user who does not write clearly may not be satisfied with his/her own handwriting. In addition, in the case of taking notes with an input device having poor sensitivity, the handwriting becomes uneven due to noise that may occur in the input device and various handwriting environments, such as hand trembling and so on. In such environments, a projected dot may be written in a place apart from the handwriting trace, or a sweeping trace, which corresponds to an abrupt change in handwriting appearing at a start or end position of the trace, may be produced. Accordingly, there is a need for a method capable of heightening the user's satisfaction by modifying the trace of handwriting into an elegant one in such environments.

In addition, there is an increasing need for a user to emphasize his/her personality by expressing text through application of his/her own fonts to his/her email, blog, and the like.

SUMMARY

Accordingly, embodiments have been made to solve the above-mentioned problems occurring in the prior art, and an aspect of embodiments provides an apparatus and method of generating personal fonts, which may modify a trace of handwriting inputted by a user into an elegant one and generate diverse personal fonts in accordance with the user's style of handwriting.

In an aspect of embodiments, there is provided an apparatus for generating personal fonts, according to embodiments, which includes a character input unit to receive an input of a character trace from a user; a character recognition unit to recognize a representative character corresponding to an input character from the input character trace; a representative trace generation unit to generate a representative trace expressing a trace of the representative character; and a trace modification unit to modify the trace of the input character by combining a weight value of the generated representative trace with the trace of the input character.

In another aspect of embodiments, there is provided a method of generating personal fonts, which includes receiving an input of a character trace from a user; recognizing a representative character corresponding to an input character from the input character trace; generating a representative trace expressing a trace of the representative character; and modifying the trace of the input character by combining a weight value of the generated representative trace with the trace of the input character, wherein the method may be performed using at least one processor.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION OF EMBODIMENTS

Figure 1:
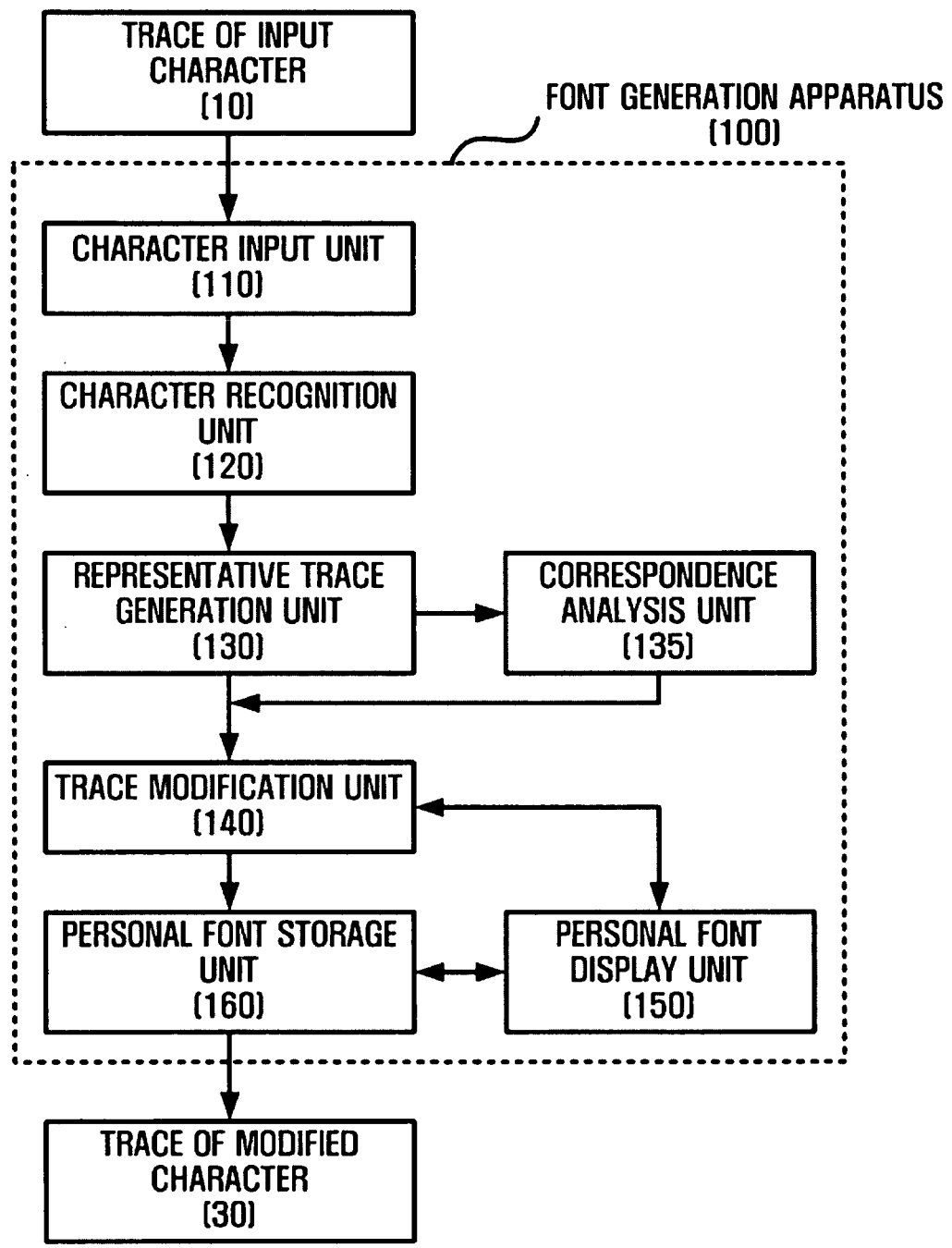
FIG. 1 is a block diagram illustrating the configuration of an apparatus for generating personal fonts according to an embodiment.

Reference will now be made in detail to embodiments, examples of which are illustrated in the accompanying drawings, wherein like reference numerals refer to the like elements throughout. Embodiments are described below by referring to the figures.

Embodiments will be described herein with reference to the accompanying drawings illustrating block diagrams and flowcharts for explaining an apparatus and method of generating personal fonts according to embodiments. It will be understood that each block of the flowchart illustrations, and combinations of blocks in the flowchart illustrations, may be implemented by computer program instructions. These computer program instructions may be provided to a processor of a general purpose computer, special purpose computer, one or more processors in a distributed network, or other programmable data processing apparatus to produce a machine, such that the instructions, which execute via the processor of the computer or other programmable data processing apparatus, to implement the functions specified in the flowchart block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including executable instructions to implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, denotes, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

FIG. 1 is a block diagram illustrating the configuration of an apparatus for generating personal fonts according to an embodiment.

Referring to FIG. 1, the apparatus 100 for generating personal fonts according to an embodiment includes a character input unit 110, a character recognition unit 120, a representative trace generation unit 130, and a trace modification unit 140.

The character input unit 110 receives an input of a character trace 10 from a user. The character input unit 110 may include a pen or other input devices, such as a touch pad, a touch screen, a tablet, a pen input device based on ultrasonic waves, and the like, or all kinds of input units through which a user may directly input character trace 10 with his/her finger and so on.

The character recognition unit 120 recognizes a representative character corresponding to an input character from the input character trace (hereinafter referred to as "input trace") 10. Here, the representative character denotes a character label corresponding to the handwriting trace of the character inputted by the user.

Figure 2:
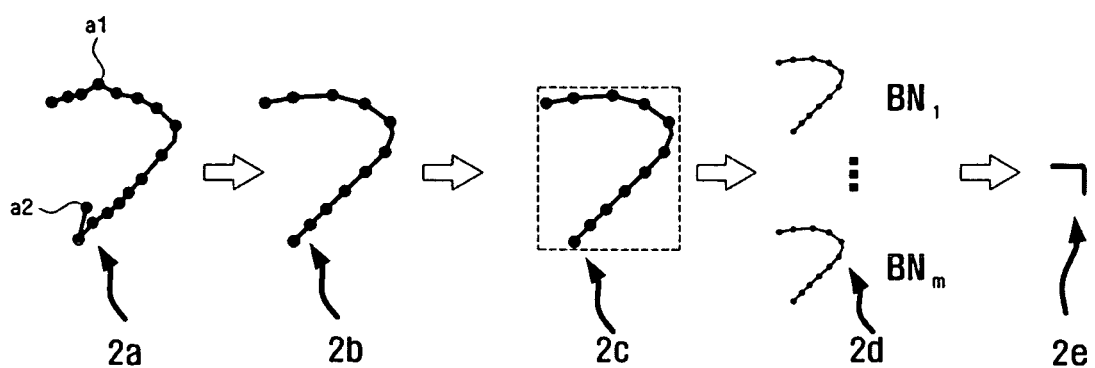
FIG. 2 is a view explaining character recognition through a character recognition unit of an apparatus for generating personal fonts according to an embodiment.

FIG. 2 is a view explaining character recognition through a character recognition unit 120 of an apparatus for generating personal fonts according to an embodiment.

The character recognition unit 120 performs preprocessing 2b of the input trace 2a, feature point extraction 2c, and matching 2d in order.

As illustrated in FIG. 2, the character recognition unit 120 first performs the preprocessing 2b to arrange points on the input trace 2a at regular intervals and to remove a projected point a1 or a sweeping component a2. Then, the character recognition unit 120 extracts feature points 2c, such as a maximum value or a minimum value in an X-axis or Y-axis direction, abrupt angle changing point, and the like, from the trace having passed through the preprocessing 2b.

The matching process 2d, in order to recognize a representative character 2e from the input trace 2a, selects a character model having the shortest distance by comparing distances of the input trace 2a and the trace of pre-stored character models, and recognizes the selected character model as the representative character corresponding to the input trace 2a. In this case, the matching process 2d may recognize the representative character 2e from the input trace 2a by performing pattern recognition by using a specified pattern recognition algorithm. Due to continuous research and development of pattern recognition, various pattern recognition algorithms have been proposed.

A character recognition unit 120 of the apparatus for generating personal fonts according to an embodiment may recognize the representative character 2e from the input trace 2a by performing the pattern recognition using a Bayesian network. The Bayesian network has been used to find out the probability characteristic of a model through an observed event.

Due to an established statistical theory and a characteristic that is strong against a noise, technology of reasoning the Bayesian network has been actively researched in the fields of machine-learning and statistics. To be described later, since constituent elements constituting the input trace 2a and position relations among them may be grasped using the Bayesian network, a separate correspondence analysis unit 135 is not required. The elements constituting the trace are points (i.e., nodes), and the position relations among them may be expressed with arcs.

The Bayesian network calculates recognition probability values by matching feature points extracted from the trace having passed through the preprocessing 2b to Bayesian network models, respectively, selects a model that generates the highest matching probability value among the calculated recognition probability values, and takes the selected model as the result of recognition. Here, the Bayesian network model denotes model parameters of a Bayesian network system that has been changed to match the collected data as a result of learning a large amount of data collected from a user. That is, the Bayesian network model may be a model that statistically expresses various traces of handwriting inputted by a user with respect to a representative character.

Figure 3A:
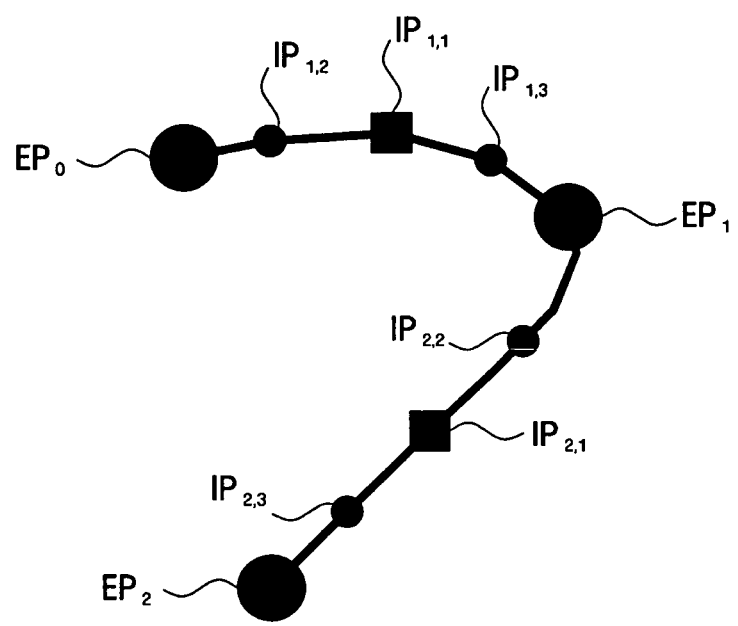
FIGS. 3A and 3B are views explaining character recognition through a matching work using a Bayesian network.
Figure 3B:
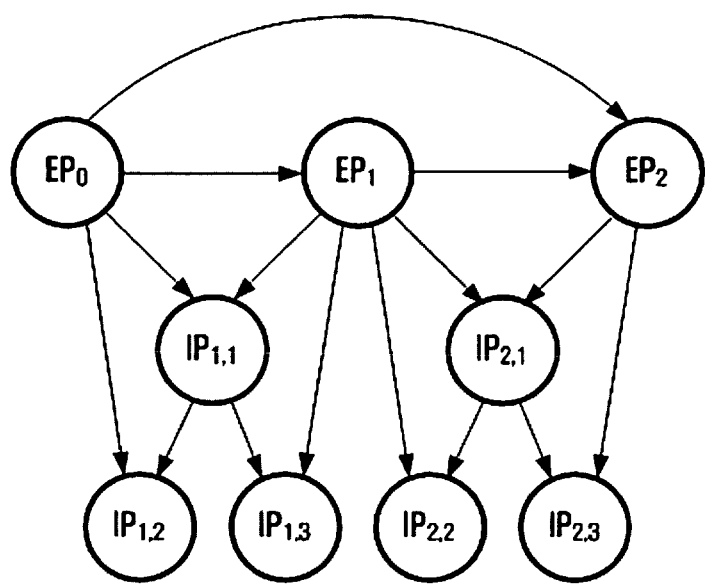

FIGS. 3A and 3B are views explaining the character recognition through a matching work using a Bayesian network.

FIG. 3A shows feature points extracted from the trace having passed through the preprocessing 2b. The respective intermediate points among the feature points may be determined by end points located on both sides of the intermediate points. That is, if it is assumed that a stroke connecting a first end point $EP_0$ and a second end point $EP_1$ is made, the position of a first intermediate point $IP_{1,1}$ may be affected by positions of the first end point $EP_0$ and the second end point $EP_1$. In other words, once the positions of the first end point $EP_0$ and the second end point $EP_1$ are known, the position of the first intermediate point $IP_{1,1}$ may be predicted with minimal error.

Also, a second intermediate point $IP_{1,2}$ existing between the first end point $EP_0$ and the first intermediate point $IP_{1,1}$ may be predicted by the first end point $EP_0$ and the first intermediate point $IP_{1,1}$, and a third intermediate point $IP_{1,3}$ existing between the second end point $EP_1$ and the first intermediate point $IP_{1,1}$ may be predicted by the second end point $EP_1$ and the first intermediate point $IP_{1,1}$.

In the same manner, an intermediate point (not illustrated) existing between the first end point $EP_0$ and the second intermediate point $IP_{1,2}$ may be predicted by the first end point $EP_0$ and the second intermediate point $IP_{1,2}$. By repeating these processes, a more detailed intermediate point may be predicted.

Also, a first intermediate point $IP_{2,1}$ between a second end point $EP_1$ and a third end point $EP_2$, a second intermediate point $IP_{2,2}$ and a third intermediate point $IP_{2,3}$ may also be predicated as processes similar to a first intermediate point $IP_{1,1}$ between a first end point $EP_0$ and a second end point $EP_1$, a second intermediate point $IP_{1,2}$ and a third intermediate point $IP_{1,3}$.

On the other hand, the prediction of the position of an intermediate point by two reference points is defined by a Gaussian distribution.

FIG. 3B shows a Bayesian network indicating the prediction of the position of an intermediate point by two reference points in an example of FIG. 3A.

For reference, the Bayesian network is composed of arcs for connection between nodes. In the Bayesian network, a node corresponds to a probability variable, and an arc expresses a relation between probability variables. For example, the position of the end point $EP_1$ depends on the position of the end point $EP_0$, and the position of the end point $EP_2$ depends on the positions of the end points $EP_0$ and $EP_1$.

Referring again to FIG. 2, it may be seen that the representative character corresponding to the character inputted by a user is "ㄱ" as a result of calculating the probability values by making the probability distribution of feature points extracted from the trace of the character inputted by the user correspond to the probability distribution of Bayesian network models, and selecting a Bayesian network model having the highest probability value.

On the other hand, pattern matching algorithms that the character recognition unit 120 uses in order to recognize a representative character from an input trace 2a include a hidden Markov model (HMM) for statistically modeling point coordinates, a neural network for classifying information in imitation of nerve cells of a human brain, and a template matching for comparing template similarities, in addition to the method using the Bayesian network.

Referring again to FIG. 1, the representative trace generation unit 130 serves to generate a representative trace 20 expressing the trace of the representative character from the representative character. The representative trace 20 may be a reference for giving a weight value in modifying the input trace 10 through the trace modification unit 140 to be described later.

The character recognition unit 120 of the apparatus 100 for generating personal fonts according to an embodiment generates the representative trace 20 by statistically modeling the constituent elements of the representative character and the position relations among them using the Bayesian network. As described above, the Bayesian network system statistically extracts the most representative type trace from a specified character based on Bayesian network based models composed of handwriting traces collected from several tens to several hundreds of people.

Figure 4:
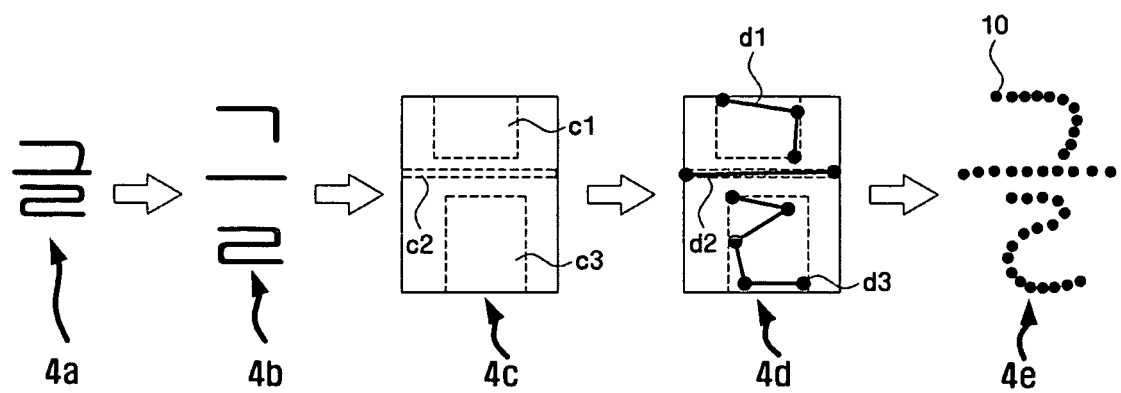
FIG. 4 is a view explaining an example of representative trace generation using a Bayesian network through a representative trace generation unit of an apparatus for generating personal fonts according to an embodiment.

FIG. 4 is a view explaining an example of representative trace generation using a Bayesian network through a representative trace generation unit of an apparatus for generating personal fonts according to an embodiment.

As shown in FIG. 4, the representative trace generation unit 130 extracts Hangul consonants and vowels or English alphabets from a character 4a inputted through the character input unit 110, i.e., from a Hangul character or an English word 4b. Also, the representative trace generation unit 130 generates position relations c1, c2, c3 among the constituent elements extracted from a large amount of data 4c. Also, the representative trace generation unit 130 generates a basic stroke d1, d2, d3 that is the core constituent element in the consonant and vowel of the Hangul character 4d. At this time, the basic stroke may be composed of a straight line or a component that is proportionate to the straight line. Last, the representative trace generation unit 130 generates a plurality of points on the generated basic stroke by using the Bayesian network 4e.

On the other hand, as shown in FIG. 1, the apparatus 100 for generating personal fonts according to an embodiment further includes a correspondence analysis unit 135. The correspondence analysis unit 135 serves to analyze the correspondence between constituent elements of the input trace 10 and the representative trace 20 through comparison and similarity analysis of the two traces.

The correspondence analysis unit 135 may be provided in the case where the character recognition unit 120 does not provide the correspondence between the input tract 10 and the representative character trace. That is, the character recognition unit 120 grasps the constituent elements and the position relations among them from the input trace 10, and if it is known for which constituent elements on the input trace 10 the respective points on the representative trace 20 are generated when the representative trace generation unit 130 generates the representative trace 20, the correspondence analysis unit 135 is not required. However, if the character recognition unit 120 that does not know such correspondence is used, a step of clearly setting the correspondence is required.

For example, in the case where the character recognition unit 120 uses the Bayesian network as a method of recognizing the character as described above, the correspondence between the input trace 10 and the trace of the representative character may be provided, and thus the correspondence analysis unit 135 is not required. By contrast, in the case of using the hidden Markov model, the neutral network, or the template matching as the character recognition method, the correspondence between the input trace 10 and the trace of the representative character is not provided, and thus the correspondence analysis unit 135 is required.

Figure 5:
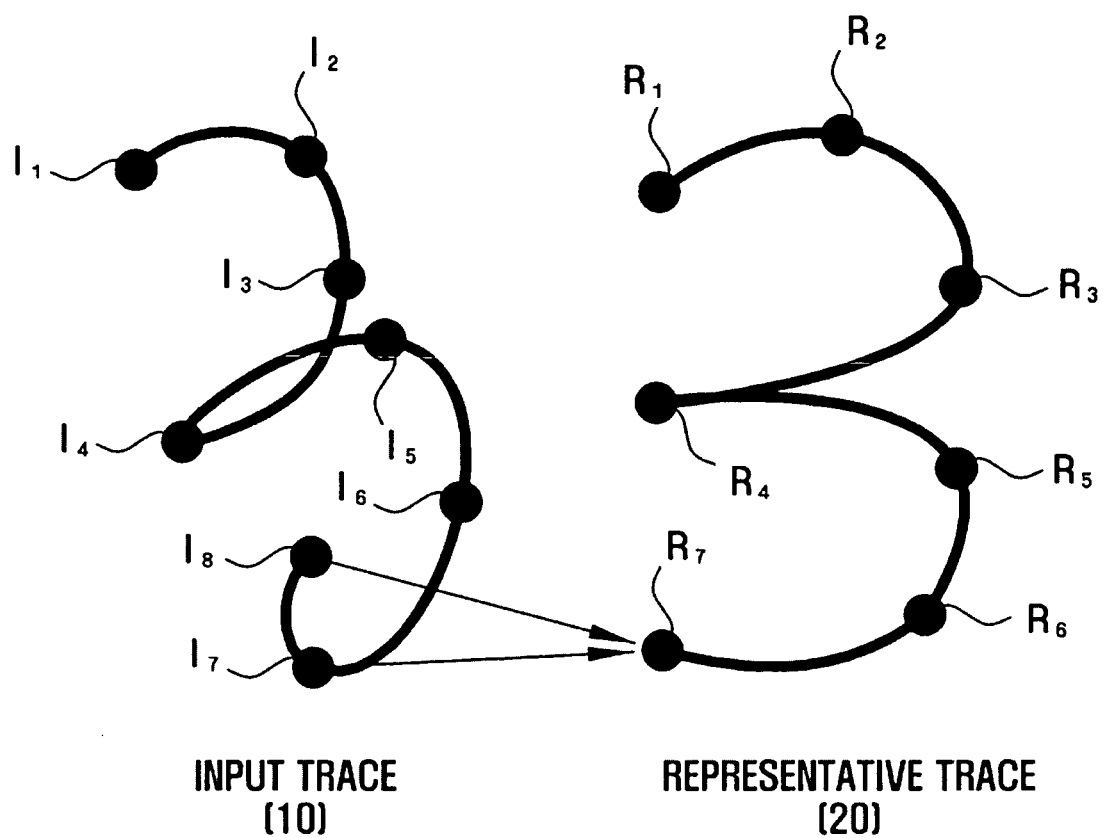
FIG. 5 is a view explaining an example of analysis of correspondence between an input character trace and a representative trace through a correspondence analysis unit of an apparatus for generating personal fonts according to an embodiment.

FIG. 5 is a view explaining an example of analysis of correspondence between an input character trace and a representative trace through a correspondence analysis unit of an apparatus for generating personal fonts according to an embodiment.

In order to calculate the correspondence between the input trace 10 and the representative trace 20, a dynamic programming matching method may be used.

For example, in order to analyze the correspondence between the coordinates $I=\{I_1, \ldots, I_N\}=\{(X_1^I, Y_1^I), \ldots, (X_N^I, Y_N^I)\}$ of the points on the input trace 10 and the coordinates $R=\{R_1, \ldots, R_M\}=\{(X_1^R, Y_1^R), \ldots, (X_M^R, Y_M^R)\}$ of the points on the representative trace 20, a dynamic programming matching method is used, being based on Equation (1).

$$D(i, j) = \min \begin{cases} D(i, j-1) + \text{dist}(I_i, R_j) \\ D(i-1, j) + \text{dist}(I_i, R_j) \\ D(i-1, j-1) + \text{dist}(I_i, R_j) \end{cases} \quad (1)$$

$$t(i, j) = \left\{ i', j' \mid D(i', j') = \min \begin{cases} D(i, j-1) + \text{dist}(I_i, R_j) \\ D(i-1, j) + \text{dist}(I_i, R_j) \\ D(i-1, j-1) + \text{dist}(I_i, R_j) \end{cases} \right\}$$

$$T(i, j) = t(i, j) \cup T(t(i, j))$$

$$\text{dist}(I_i, R_j) = \|I_i - R_j\| = \sqrt{(X_i^I - X_j^R)^2 + (Y_i^I - Y_j^R)^2}$$

correspondence=T(N,M)

Here, dist(i,j) denotes a distance between the coordinates of the point i on the input trace 10 and the coordinates of the point j on the representative trace 20. The distance between the coordinates of the two points may be expressed as a Euclidean distance.

As defined in Equation (1), the distance between the coordinates of the point i on the input trace 10 and the coordinates of the point j on the representative trace 20 is not determined only by the distance dist(i,j) between the corresponding coordinates, but may be determined through selection of a small vale among a distance D(i-1,r-1) between the coordinates of the point on the input trace 10 prior to the corresponding coordinates and the coordinates of the point j on the representative trace 20 prior to the corresponding coordinates, a distance D(i-1,r) between the coordinates of the point on the input trace 10 prior to the corresponding coordinates and the coordinates of the point j on the representative trace 20 of the corresponding coordinates, and a distance D(i,r-1) between the coordinates of the point on the input trace 10 of the corresponding coordinates and the coordinates of the point j on the representative trace 20 prior to the corresponding coordinates.

A distance table D(i,j) included in Equation (1) may be updated by an algorithm as in Equation (2).

```
// Initialization
D(1, 1) = dist(I₁, R₁)
T(1, 1) = {(1, 1)}
// Recursive update
For I = 1 to N
    For r = 1 to M
        If I ==1 and r ==1
Continue; // D(1, 1) has already been initialized.
    EndIf
```

$$D(i, j) = \min \begin{cases} D(i, j-1) + \text{dist}(I_i, R_j) \\ D(i-1, j) + \text{dist}(I_i, R_j) \\ D(i-1, j-1) + \text{dist}(I_i, R_j) \end{cases} \quad (2)$$

$$t(i, j) = \left\{ i', j' \mid D(i', j') = \min \begin{cases} D(i, j-1) + \text{dist}(I_i, R_j) \\ D(i-1, j) + \text{dist}(I_i, R_j) \\ D(i-1, j-1) + \text{dist}(I_i, R_j) \end{cases} \right\}$$

$$T(i, j) = t(i, j) \cup T(t(i, j))$$

```
    EndFor
EndFor
```

Final_Correspondence=T(N, M)

Since the general dynamic programming matching method for analyzing the correspondence between the input trace 10 and the representative trace 20 is well known in the art, the detailed description thereof will be omitted. In addition, in order to analyze the correspondence between the input trace 10 and the representative trace 20, another method except for the dynamic programming matching method may be used. For example, a method of re-extracting the two traces with the same number of points and at regular intervals and then combining the traces may be used.

In an example of FIG. 5, it may be known that the point on the representative trace 20 that corresponds to the point $I_i$ on the input trace 10 is $R_i$. Although one point on the input trace 10 may correspond to one point on the representative trace 20, one point may also correspond to a plurality of points. In FIG. 5, it may be seen that points $I_7$ and $I_8$ in the input trace 10 correspond to one point $R_7$ on the representative trace 20.

The trace modification unit 140 serves to modify the input trace 10 by combining a weight value of the generated representative trace 20 with the input trace 10. In accordance with the correspondence between the trace of the input character and the trace of the representative character, the corresponding constituent elements may be linearly or non-linearly combined.

As described in Equation (1), if it is assumed that the correspondence between the coordinates I={$I_1, \ldots, I_N$} of the points on the input trace 10 and the coordinates R={$R_1, \ldots, R_M$} of the points on the representative trace 20 is expressed as correspondence=T(N,M), and the weight value is given as w, the modified trace N(t) may be generated using Equation (3).

$$T(N,M)_t = (i,j)$$

$$N(t) = w \cdot I_i + (1-w) \cdot R_j \quad (3)$$

Here, N(t) denotes the t-th coordinates on the modified trace, and the weight value w may be defined by a user as a linear weight value having a value in the range of 0 to 1. As defined in Equation (3), as the weight value w is near 0, the modified trace becomes similar to the representative trace 20.

Figure 6:
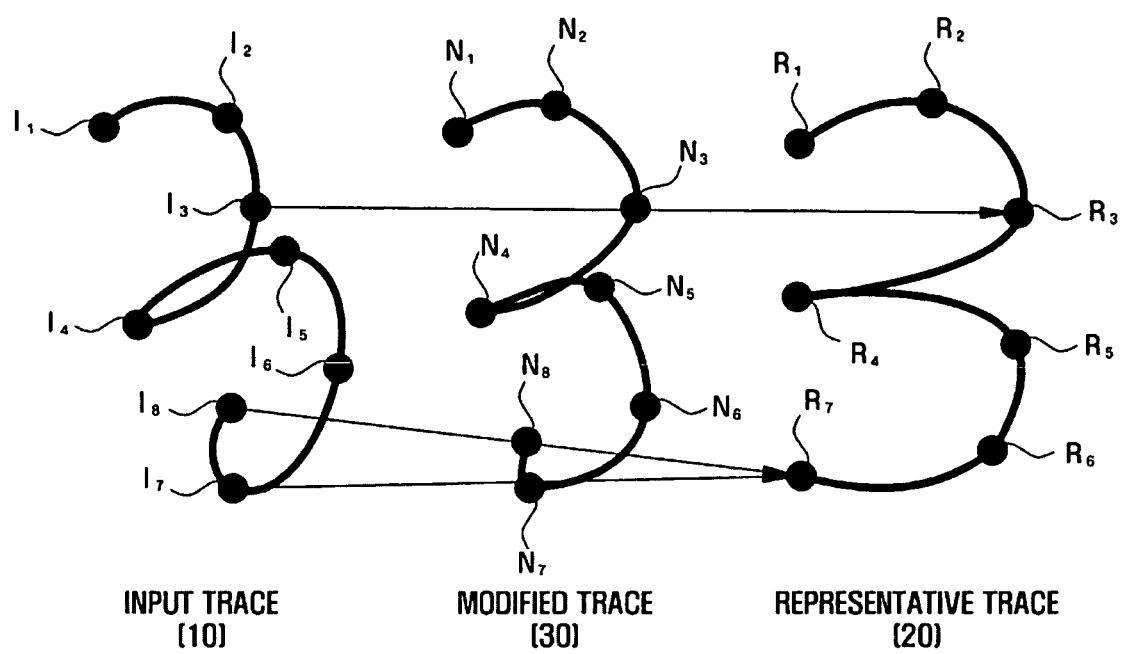
FIG. 6 is a view explaining an example of modified trace generation through a linear combination of an input character trace and a representative character trace.

FIG. 6 is a view explaining an example of modified trace generation through a linear combination of an input character trace and a representative character trace.

In an example of FIG. 6, points $N_i$ are generated by linearly combining points $R_i$ on the representative trace 20, which correspond to points $I_i$ on the input trace 10, and giving a weight value to the combined points. Here, it is exemplified that the weight value w is 0.5. Accordingly, the point $N_i$ on the modified trace 30 denotes an intermediate point between the point $I_i$ on the input trace 10 and the point $R_i$ on the corresponding representative trace 20.

On the other hand, the apparatus for generating personal fonts according to an embodiment further includes a personal font storage unit 150 and a personal font display unit 160.

The personal font storage unit 150 serves to store both the modified trace of the input character and the representative character corresponding to the result of recognition of the input character. In an example of FIG. 6, the generated modified trace 30 and the representative character "3" may be stored in the personal font storage unit 150. Specifically, the representative characters and the corresponding modified traces may be stored in the form of a table in the personal font storage unit 150.

The personal font storage unit 150 is a module capable of inputting/outputting information, such as a hard disk, a flash memory, a compact flash (CF) card, a secure digital (SD) card, a smart media (SM) card, a multimedia card (MMC), a memory stick, or the like, and may be provided in the personal font generation device 100 or in a separate device.

The persona font display unit 160 serves to display the modified trace of the input character on a display screen. As the personal font display unit 160, a cathode ray tube (CRT), a liquid crystal display (LCD), a light-emitting diode (LED), an organic light-emitting diode (OLED), or a plasma display panel (PDP) may be used.

On the other hand, although not illustrated in the drawings, a control unit controlling operations of the character input unit 110, the character recognition unit 120, the representative trace generation unit 130, the correspondence analysis unit 135, the trace modification unit 140, the personal font display unit 160, and the personal font storage unit may be included in the apparatus 100 for generating personal fonts.

The operation of the apparatus 100 for generating personal fonts as configured above will now be described.

Figure 7:
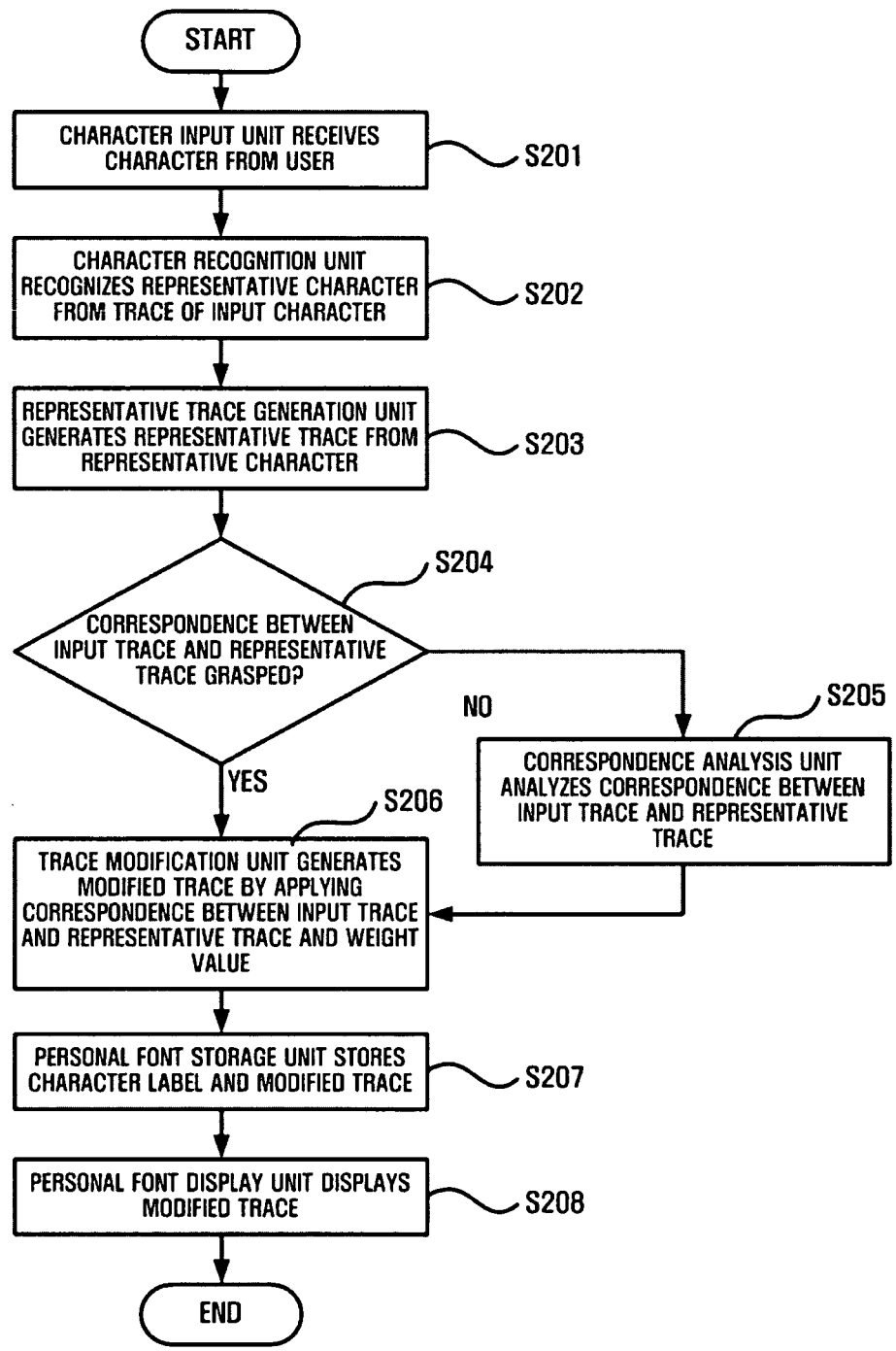
FIG. 7 is a flowchart illustrating a method of generating personal fonts by using an apparatus for generating personal fonts according to an embodiment.

FIG. 7 is a flowchart illustrating a method of generating personal fonts by using an apparatus for generating personal fonts according to an embodiment.

First, the character input unit 110 receives a character from a user S201, and the character recognition unit 120 recognizes a representative character from the input trace 10 S202. Then, the representative trace generation unit 130 generates a representative trace 20 from the representative character S203, and judges whether the correspondence between the input trace 10 and the representative trace 20 is grasp S204.

If it is not known for which constituent elements on the input trace 10 the respective points on the representative trace 20 are generated ("NO" at S204) when the representative trace 20 is generated, the correspondence analysis unit 135 may analyze the correspondence between the input trace 10 and the representative trace 20 S205.

If the correspondence between the input trace 10 and the representative trace 20 is known S204, or after the correspondence is analyzed S205, the trace modification unit 140 modifies the input trace 10 by applying the correspondence between the input trace 10 and the representative trace 20 and the weight vale to the input trace S206.

After the modified trace 30 for the input trace 10 is generated, the modified trace 30 is stored in the personal font storage unit 150 together with a character label corresponding to the input character S207, and the modified trace 30 is displayed through the personal font display unit 160 S208.

As described above, according to the apparatus 100 and method of generating personal fonts according to an embodiment, the trace of handwriting inputted by a user through a device, such as a PC, a TV, or the like, is modified into an elegant one in accordance with user's style of handwriting, and thus the user is more satisfied. Also, various fonts in accordance with the user's style of handwriting are generated and applied to an email, blog, and the like, and thus the user's own personality may be emphasized. In addition, even if the user inputs a character string through an input device such as a keyboard, without directly taking written notes, the user's own handwriting trace already stored may be displayed on a display screen.

Although a few embodiments have been shown and described, it would be appreciated by those skilled in the art that changes may be made in these embodiments without departing from the principles and spirit of embodiments, the scope of which is defined in the claims and their equivalents.

What is claimed is:

1. An apparatus for generating personal fonts, comprising:
    a character input unit to receive an input of a character trace, which has at least one feature point, from a user;
    a character recognition unit to recognize a representative character corresponding to an input character from the input character trace;
    a representative trace generation unit to generate a representative trace expressing a trace of the representative character;
    a trace modification unit to modify a position of the at least one feature point on the trace of the input character by combining a weight value of the generated representative trace with the trace of the input character using at least one processor to generate the personal fonts; and
    a correspondence analysis unit to analyze correspondence between constituent elements of the input character trace and the generated representative trace if the correspondence between the constituent elements is not provided by comparing the trace of the input character and the generated representative trace.

2. The apparatus of claim 1, wherein the character recognition unit selects and recognizes a character model having the minimum distance by comparing distances between the traces of the input characters and traces of the pre-stored character models.

3. The apparatus of claim 1, wherein the character recognition unit recognizes the representative character by performing pattern recognition with respect to the trace of the input character by using a Bayesian network.

4. The apparatus of claim 1, wherein the representative trace generation unit generates the representative trace by statistically modeling the constituent elements of the representative character and position relations among the constituent elements of the representative character by using a Bayesian network.

5. The apparatus of claim 1, wherein the correspondence analysis unit uses a dynamic programming matching method.

6. The apparatus of claim 1, wherein the trace modification unit linearly or non-linearly combines and generates corresponding constituent elements of a modified input character in accordance with correspondence between the trace of the input character and the trace of the representative character.

7. The apparatus of claim 1, further comprising a personal font storage unit to store a modified trace of the input character and the representative character.

8. The apparatus of claim 1, further comprising a personal font display unit to display a modified trace of the input character on a display screen.

9. A method of generating personal fonts, comprising:
    receiving an input of a character trace, which has at least one feature point, from a user;
    recognizing a representative character corresponding to an input character from the input character trace;
    generating a representative trace expressing a trace of the representative character;
    modifying a position of the at least one feature point on the trace of the input character by combining a weight value of the generated representative trace with the trace of the input character to generate the personal fonts; and
    analyzing the correspondence if the correspondence between constituent elements of the input character trace and the representative character is not provided by comparing the trace of the input character and the generated representative trace,
    wherein the method is performed using at least one processor.

10. The method of claim 9, wherein the recognizing comprises selecting and recognizing a character model having the minimum distance by comparing distances between the traces of the input characters and traces of the pre-stored character models.

11. The method of claim 9, wherein the recognizing comprises recognizing the representative character by performing pattern recognition with respect to the trace of the input character by using a Bayesian network.

12. The method of claim 9, wherein the generating comprises generating the representative trace by statistically modeling constituent elements of the representative character and position relations among the constituent elements of the representative character by using a Bayesian network.

13. The method of claim 9, wherein the analyzing comprises using a dynamic programming matching method.

14. The method of claim 9, wherein the modifying comprises linearly or non-linearly combining and generating corresponding constituent elements of a modified input character trace in accordance with correspondence between the trace of the input character and the trace of the representative character.

15. The method of claim 9, further comprising storing a modified trace of the input character and the representative character.

16. The method of claim 9, further comprising displaying a modified trace of the input character on a display screen.

* * * * *